United States Patent [19]

Rivamonte

[11] Patent Number: 5,140,418

[45] Date of Patent: Aug. 18, 1992

[54] SYSTEM FOR QUANTITATIVELY EVALUATING IMAGING DEVICES

[75] Inventor: Lorenzo A. Rivamonte, Huntsville, Ala.

[73] Assignee: The United States of America as represented by the Secretary of the Army, Washington, D.C.

[21] Appl. No.: 670,825

[22] Filed: Mar. 18, 1991

[51] Int. Cl.$^5$ .................................... H04N 17/00
[52] U.S. Cl. ............................... 358/139; 358/10; 358/211
[58] Field of Search ............... 358/139, 10, 211; 356/124, 124.5

[56] References Cited

U.S. PATENT DOCUMENTS

| | | | |
|---|---|---|---|
| 4,641,961 | 2/1987 | Yamada | 356/124 |
| 4,951,141 | 8/1990 | Fischer | 358/139 |
| 5,015,867 | 5/1991 | Siegel et al. | 358/107 |
| 5,047,855 | 9/1991 | Correa | 358/139 |

Primary Examiner—James J. Groody
Assistant Examiner—Minsun Oh
Attorney, Agent, or Firm—Freddie M. Bush; Howard G. Garner

[57] ABSTRACT

A system for quantitatively evaluating resolution and image quality of devices which produce images or images produced by such devices. A charge coupled device (CCD) camera is disposed in a position to view a standard resolution test pattern displayed or produced by an imaging device and generates a video signal in response to the images viewed by the CCD camera. The video signal is modified by a custom image analysis circuit to provide 1) a video signal with a blanked region of interest and 2) triggering pulses to measure light intensity variations of this region using an oscilloscope. The easily moved, highlighted region of interest within the video image viewed on a monitor is digitized by the oscilloscope to provide quantitative data representing the imaging device's ability to faithfully reproduce detail at various spatial scales. A series of standard resolution patterns are measured and a modulation transfer function is fitted to the level of light modulation of individual resolution targets. Large modulation values correspond to the enhanced ability of the imaging system to record detail as the fineness of the patterns increase. The Simplex Algorithm is applied to the data to uniquely fit a cumulative log normal distribution as an approximation of the modulation transfer function of the device.

4 Claims, 3 Drawing Sheets

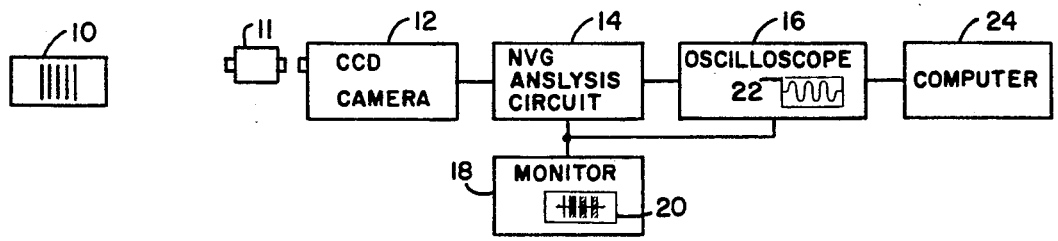
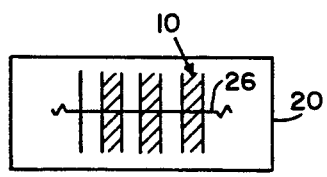
FIG. 2
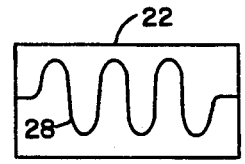
FIG. 3
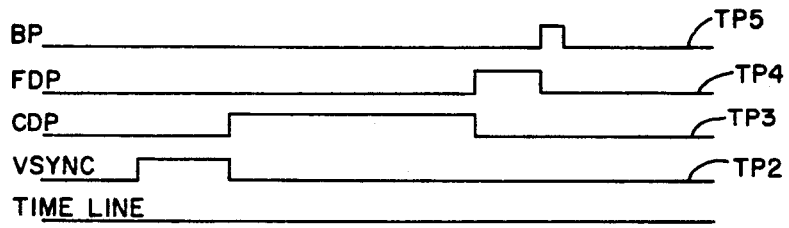
FIG. 4
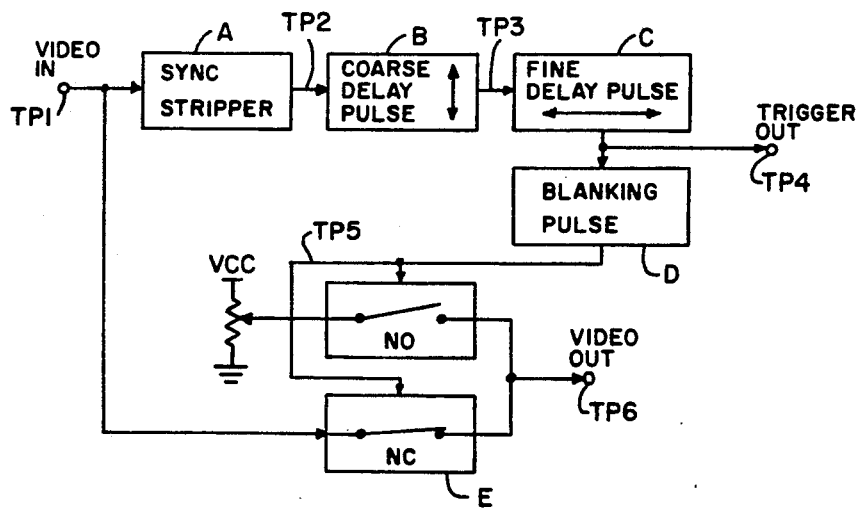
FIG. 5

SYSTEM FOR QUANTITATIVELY EVALUATING IMAGING DEVICES

DEDICATORY CLAUSE

The invention described herein may be manufactured, used, and licensed by or for the Government for governmental purposes without the payment to me of any royalties thereon.

BACKGROUND OF THE INVENTION

This invention relates to a system for quantitatively evaluating and characterizing imaging devices. The invention comprises an electro-optical system and a data analysis technique for the quantitative characterization of generated image and enables the comparison of such measurements with established standards of resolution and image quality. The necessity for a rapid, accurate means of characterize imaging systems arose from a request to objectively evaluate the image quality of U.S. Army night vision goggles (NVG) suspected in contributing to certain helicopter accidents. The field evaluated prototype of this effort is referred to as the "NVG Resolution Augmentation (NVGRA) to the AN/3895 TS".

The present method of resolution evaluation of U.S. Army night vision goggles (NVG) relies on an imprecise subjective pass/fail judgment by a trained observer viewing a test pattern through the NVG. The resolution of NVG is presently determined by examining a series of carefully designed patterns which vary in fineness of detail. For the purpose of this application only the reticle (test pattern) used in the latest revision of the AN/3895 Test Set (TS) will be considered. The reticle viewed by the NVG under this test includes two horizontal sets of numbered gratings 72 millimeters apart, consisting of:

(1) Group 2, Element 6 through Group 3 Element 5 of the U.S. Air Force 1951 Resolution Target for high light level testing.

(2) Group 1, Element 4 through Group 2 Element 3 of the U.S. Air Force 1951 Resolution Target for low light level testing.

Between the two horizontal sequences of six targets is a black rectangular box whose two sides subtend a field measuring one by six degrees. Centered in this rectangular box is a small circular hole whose diameter subtends six minutes. These targets are centered in the 40 degree field of view of test set. The present procedure requires a trained technican to clearly resolve a designated rating in each of two set of targets when viewed at the proper light level for a given model of the NVG. Determining which of the targets is clearly resolved is subjective and, consequently, imprecise.

SUMMARY OF INVENTION

The imaging device characterization system of the invention comprises a charge coupled device (CCD) camera, a custom image analysis circuit, a monitor, a digital oscilloscope, and a computer used for data acquisition and execution of unique data analysis techniques which produce repeatable, accepted measures of image quality. For the application that the invention was field tested, the choice of lens and the CCD camera is important since the radiance of the night vision goggles' phosphor screen is relatively low, especially at low ambient light levels. The best overall choice for the AN/PVS-5, AN/AVS-6 or AN/PVS-7 night vision goggles is a low F-number 50 millimeter lens. The DAGE MTI CCD-72 Camera which is a repackaged Sony XC 77 Camera, with improved electronics, work well in the system of the invention.

The choice of the monitor, VCR, the digital oscilloscope and the computer is not deemed to be critical. Each of these components can be off-the-shelf items. The only nonstandard item in this system is the custom image analysis circuit. This circuit adds additional stages to a traditional oscilloscope TV synchronization circuit. An oscilloscope TV synchronization circuit uses a synchronization signal stripper similar to the ones found in common TV sets, then counts the number of lines or provides a delay after a vertical synchronization pulse to move down the image. The vertical synchronization pulse for NTSC-170 Video marks the beginning of a new picture (field) which occurs sixty times a second. The additional stages of the invention provide a variable length blanking pulse which highlights a portion of a line (raster) of the video image as viewed by the operator on a monitor and in addition provides a trigger pulse to the oscilloscope at the beginning of the highlighted portion of the line for the quantitative evaluation of the selected portion of the video signal. Basically, the operator uses the up/down and a left/right controls of the custom circuit to move a highlighted line over an image viewed on a monitor and the light intensities of this region of interest are measured and displayed on the oscilloscope screen.

It is the object of the invention to provide a system for quantitatively evaluating the performance of image producing devices by reproducing the image with a video camera of known characteristics and analyzing selected portions of the video signal.

It is another object of the invention to provide a system for interpreting standard resolution patterns displayed by imaging devices in such a way as to produce repeatable, quantitative measures of resolution and image quality which can be correlated to standard measures of resolution and image quality.

It is another object of the invention to provide a system which affords continuous feedback by highlighting an easily moved region of interest (ROI) on the image being viewed and analyzed.

BRIEF DESCRIPTION OF THE DRAWINGS

The invention will now be described in conjunction with the appended drawings, in which:

FIG. 1 is a schematic diagram of the imaging device evaluation system of the invention;

FIG. 2 is a schematic diagram of the monitor screen viewing a single line (bar) target of the system illustrated in FIG. 1;

FIG. 3 is a schematic view illustrating the oscilloscope screen of the system illustrated in FIG. 1;

FIG. 4 is a graphic view of a series of sequentially triggered one-shot timer signals necessary to produce a controlled location video blanking pulse;

FIG. 5 is a diagrammatic illustration of the custom image analysis circuit of the invention;

DETAILED DESCRIPTION OF THE INVENTION

Figure 6:
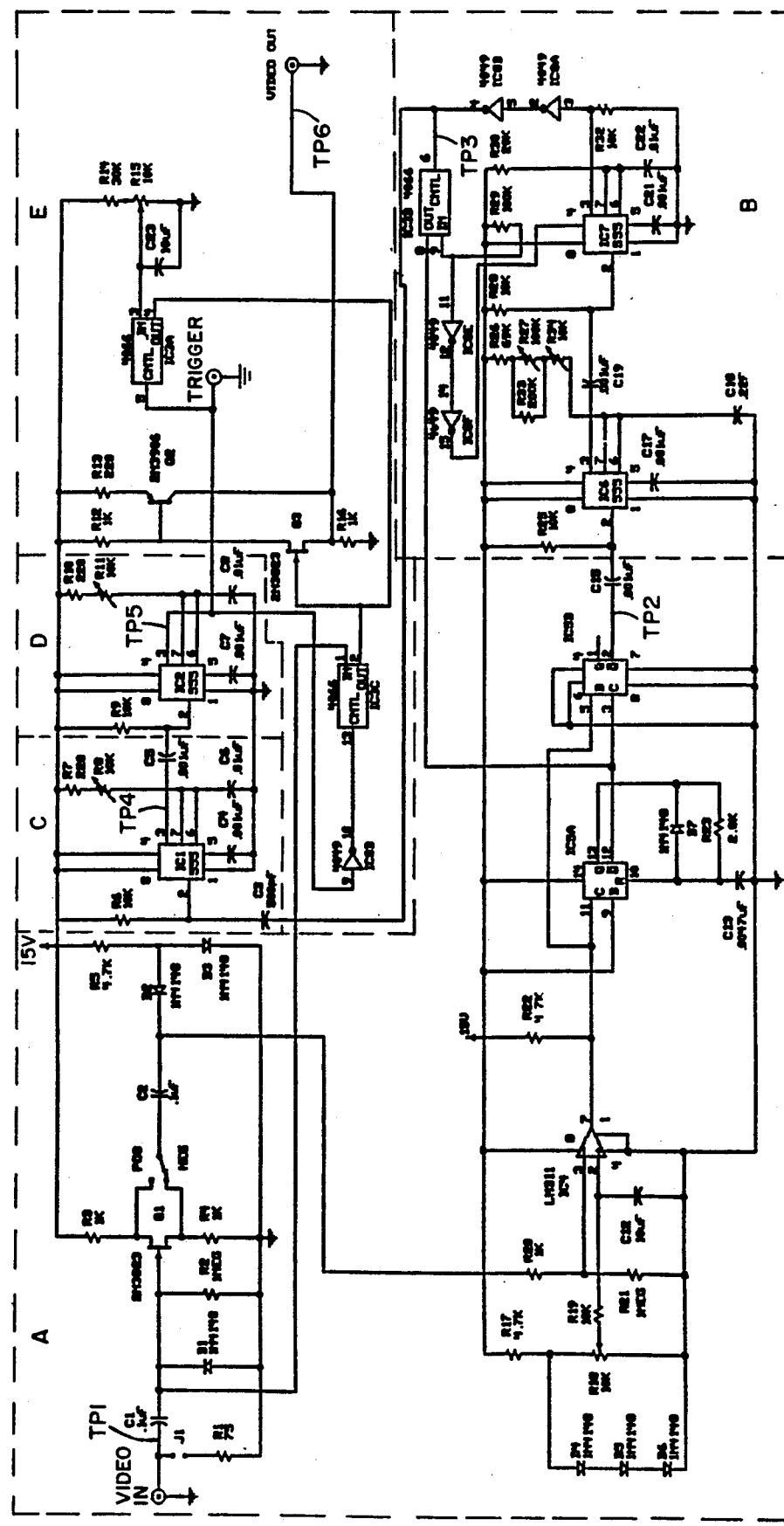
FIG. 6 is a wiring diagram of the custom image analysis circuit illustrated in FIG. 5.

In general the system for quantitatively evaluating imaging devices according to the invention comprises a CCD camera, a custom electronic circuit, a monitor, a digital oscilloscope and a computer with unique software for quantitatively measuring and analytically determining the quality of an image which is normally viewed, adjusted or inspected by a human observer. The proof-of concept implementation of the invention is called the "NVG Resolution Augmentation to the AN/3895 TS" (NVGRA). This device features a custom electronic circuit which provides a user-friendly interface between the image being evaluated on the monitor and the oscilloscope making the quantitative measurement. Basically, this custom circuit produces a easily moved highlighted line segment on the image being displayed by the monitor and synchronizes the beginning of the highlighted line segment with the oscilloscope thus triggering the beginning of a measurement. By selecting standard test patterns, for example, the U.S. Air Force 1951 Resolution Target, the imaging device's absolute as well as its relative resolution performance can be determined. Objectively measuring the light modulation of a series of bar gratings ranging from a grating with widely spaced, equally spaced black and white bars of equal width to a grating with closely spaced bars, the modulation transfer function (MTF) can be determined. The invention uniquely determines a MTF which best fitting the data by assuming the MTF is a cumulative log normal distribution function and fits the data using the Simplex Algorithm. While the cumulative log normal distribution function is a common distribution function and the Simplex Algorithm is a common data fitting technique, when used in combination for this application they produce a measure which is comparable to accepted standards of resolution and image quality. A characterized image analysis system such as that of the invention enables absolute, as well as relative, measurements of image quantity produced by imaging devices.

The NVGRA comprises a CCD camera, a custom image analysis circuit, a monitor, a digital oscilloscope, a computer and a unique application common data reduction techniques. All of these elements other than the custom image analysis circuit and the computer code necessary to produce repeatable, comparable results, are standard-off-the-shelf items. The custom image analysis circuit combines a typical oscilloscope TV synchronization circuit with additional stages of video image and sychronization signal processing. The standard oscilloscope TV synchronization circuit uses a sync stripper similar to those found in standard television sets, and then counts the number of lines or provides a delay after a vertical sync pulse to move down the image to a particular horizontal line composing displayed image. The custom image analysis circuit, in addition to selecting an individual horizontal line, generates a variable width highlighted line segment on the selected horizontal line on the monitor viewing the image. This highlighted line segment can be moved horizontally (left and right) as well as vertically (up and down) by controls on the custom image analysis circuit.

This same highlighted region of the displayed image is sent to the oscilloscope for measurement by the custom image analysis circuit by providing the video signal and a triggering pulse situated at the beginning of highlighted region. Once the trace of light intensity versus time is captured by the oscilloscope it is transferred to the computer for analysis. The capture of several traces over several line grating targets of varying fineness of line (bar) spacing of the test pattern results in each grating contributing one data point to a plot which can be fitted with a cumulative log normal distribution function as an approximation of the modulation transfer function for the imaging device under test.

FIGS. 4, 5 and 6 illustrate a series sequentially triggered one-shot timers which are initiated by the vertical sync pulse.

These one-shot timers ultimately result in highlighting a region of an image displayed on the monitor by switching in a constant voltage in place of the video signal for the duration of a blanking pulse. The blanking pulse length is determined by the blanking pulse one-shot timer. The blanking pulse is moved up and down by the coarse delay one-shot timer. The fine delay one-shot timer moves the blanking pulse to the left and right. The NVGRA blanking pulse is normally set at 5 microseconds. The fine delay one-shot timer never exceeds the length of an individual line, that is, 61.5 microseconds for standard NTSC-170 video. The coarse delay one-shot timer never exceeds the length of two fields, that is 33,000 microseconds. With this circuit, the user does not have to adjust the trigger level, hold off, or delay since the circuit accomplishes these tasks by knowing the position of the highlighted region on the image displayed on the monitor.

The highlighted region is easily moved about the image displayed on the monitor by an up-down knob and a right-left knob. Other controls vary the appearance of the region being analyzed from bright to dark, triggering the scope either at the beginning of a highlighted line or at its end, the highlighting of either one or both fields, and the length of the region highlighted on the screen. In addition, a short duration ring, introduced by the blanking pulse, marks the beginning and the end of the oscilloscope trace corresponding to the edges of the highlighted region on the monitor. Normally the beginning/end ring is simply used to aid in centering and adjusting the oscilloscope's display to correspond with the highlighted region on the monitor; that is, the time per division control on the oscilloscope is adjusted to make the viewed trace length of the oscilloscope equal the highlighted raster length on the monitor. The only other oscilloscope adjustment is the volts per division control, which varies the viewed amplitude of the waveform.

Referring now to FIGS. 1, 2, and 3 of the drawings wherein is illustrated the system for quantitatively evaluating the resolution of imaging devices according to the invention. As seen best in FIG. 1, the system comprises a test pattern 10, a night vision goggle 11 which is supported to focus onto test pattern 10 and a CCD camera 12 which is focused onto the image produced by night vision goggle 11. The output of the CCD camera 12 is connected to the custom image analysis circuit 14 where it is conditioned prior to analysis (as will be described in greater detail hereinafter). The custom image analysis circuit outputs two signals, triggering pulses for the oscilloscope and a blanked video signal sent to oscilloscope 16 and a monitor 18. The blanked video output of the analysis circuit 14 will be displayed on monitor screen 20 and the video blanked from the original image is digitized by the oscilloscope and displayed on oscilloscope screen 22. A computer 24 is interfaced with the oscilloscope 16 and receives data measured by the oscilloscope 16 for analysis. Each measurement using a series of line (bar) gratings results as a single data point defining the MTF which is a measure used to characterize the imaging device, in this case a night vision goggle 11. The data is fitted using standard techniques but in a unique combination, a cumulative log normal distribution function is used as an approximation of the underlying MTF by application of the Simplex Algorithm to find the best fit of the data.

FIG. 2 shows a detailed view of screen 20 of monitor 18 and highlight line 26 indicates the point of test pattern 10 being examined by the system through the night vision goggle 11.

FIG. 3 is detailed view of the oscilloscope screen 22 and shows an enlarged view of waveform 28 generated in response to the analysis made by the analysis circuit 14. Computer 24 assists in the measurements made by the system. The computer controls the data acquisition of oscilloscope 16 and the revision of the menu driven program. The computer initializes the oscilloscope to a preset condition, guides the user while the oscilloscope is instructed to automatically make the appropriate measurements and to transfer the information to the computer. The computer provides interrupt-activated help screens and copies the display of the oscilloscope onto the screen of the computer.

The computer also displays duplicate instructions and information on the display of oscilloscope and analyzes and saves data to a file. The computer computes and plots the MTF and computes an inverse fourier transform and displays a 3D display of the night vision goggle point spread function. All or part of this information may be dumped to a printer to generate a test report. The performance of a particular night vision goggle can be tracked by saving the oscilloscope measurements on an individual floppy diskette and a video cassette tape.

Referring now to FIGS. 4, 5, and 6 wherein details of analysis circuit 14 are illustrated. FIG. 4 illustrates graphically against a time line, the timing of the blanking pulse (BP), the fine delay pulse (FDP), the coarse delay pulse (CDP), and the vertical sync pulse (VSP) against a time line.

FIG. 5 illustrates diagrammatically the elements comprising custom image analysis circuit 14. These comprises a sync stripper A, a coarse delay pulse B, a fine delay pulse C, a blanking pulse D, and a video blanking circuit E. Each of these elements are illustrated in detail in the wiring diagram shown in FIG 6. The portion constituting each of these elements are in FIG. 6 separated and/or identified in the wiring diagram. These elements will now be described in detail in connection with the wiring diagram illustrated in FIG. 6.

The sync stripper circuit A comprises the following elements. The video input jack accepts standard NTSC-170 composite signal from a camera or the other video source. The signal at TP1 is the raw video signal from the camera 12 or other video source. This signal can be impedance matched via J1 and R1, if desired. The composite signal passes through coupling capacitor C1 to the phase inverter Q1. Resistor R2, R3, and R4 provide bias for Q1 and diode D1 protects Q1 from negative voltage transients. The switch attached to the source and drain of Q1 allows the processing of signals with negative, (NEG) or positive (POS) synchronization pulses. Capacitor C2 couples the signal to the comparator IC4 while resistor R5 and diodes D2 and D3 provides DC restoration to the signal in order for the comparator IC4 to detect the signal's synchronization pulses at a clamped DC level irrespective of the video waveform of the composite signal. The signal is then reduced by a voltage divider composed of R20 and R21 and fed to the comparator IC4. The signal is compared to a fixed DC voltage obtained using R17, R18, R19, D4, D5, D6, and C12. The output of the comparator pulled up by R22 is the initial composite video signal stripped of all video and consists only of horizontal and vertical synchronization pulses. Flip-Flop IC5A stretches each sync pulse to a uniform length determined by the RC time constant set by D7, C13, and R23. Flip-Flop IC5B compares the stretched sync pulse and the raw horizontal and vertical sync pulses and outputs a vertical sync pulses which corresponds to the beginning of each field of video. It should be noted that the circuit described above can be replaced by a dedicated IC chip and a simple filter consisting of a resistor and a capacitor, specifically a National Instruments Corporation LM1880 integrated circuit chip.

The coarse delay circuit B comprises the following elements. The vertical sync pulses from IC5B are coupled through capacitor C15 and pulled up by R25 in order to trigger timer IC6 which produces a single pulse determined by the RC time constant established by R26, R27, R33, R34, and C18. This long time delay establishes which raster line will be selected by simply providing a timing edge within a field. This pulse from IC6 is coupled through capacitor C19 and pulled up by R28 in order to trigger timer IC7. Timer IC7 stretches the coarse delay from IC6 to correspond to the beginning of the next raster line. This is accomplished by closing CMOS switch IC3D via buffer inverters IC8A and IC8B. The closing of this switch allows the next available horizontal sync pulse to reset timer IC7 via buffer inverters IC8E and IC8F. Resistor R29 pulls up the input of inverter buffer IC8E. Resistor R30 and capacitor C22 provide the RC time constant for timer IC7. However, it should be noted that the length of the pulse out of this timer is determined by the reset and not by the value of its RC time constant. The output of the coarse delay circuit TP3 marks the beginning of the selected raster line. Timers IC6 and IC7 are decoupled by capacitors C17 and C21, respectively, as recommended by the manufacturer. The raster line selected is determined by adjusting R8.

The fine delay circuit C comprises the following elements. The pulse (timing edge) from the coarse delay circuit which marks the beginning of the raster line of interest is coupled through capacitor C3 and pulled up by R6 in order to trigger timer IC1, which, produces a single pulse TP4 determined by the RC time constant established by R7, R8, and C4. This relatively short time delay establishes where on the raster line the region of interest (ROI) will begin by simply providing a timing edge within the raster line. Timer IC1 is decoupled by capacitor C4, as recommended by the manufacturer. The beginning of the ROI is determined by adjusting R8. The blanking pulse circuit D comprises the following elements. The pulse (timing edge), from the fine delay circuit which marks the beginning of the ROI, is coupled through capacitor C5 and pulled up by R9 in order to trigger timer IC2 which produces a single pulse TP5 determined by the RC time constant established by R10, R11, and C8. This short pulse determines the length of the ROI and provides a trigger for the oscilloscope 16 in order to evaluate the ROI. Timer IC2 is decoupled by capacitor C7 as recommended by the manufacturer. The length of the ROI is determined by adjusting R11.

The video blanking circuit E comprises the following elements. The blanking pulse from the blanking pulse circuit controls normally open (NO) CMOS switch IC3A and normally closed (NC) CMOS switch IC3C. NC CMOS switch IC3C is held normally closed by buffer inverter IC8D. Most of the time, the composite video signal passes unaltered through CMOS switch IC3C to an isolation/output amplifier composed of R12, R13, R16, Q2, and Q3, (TP6). When the blanking pulse is present to mark the ROI, the video signal is removed and replaced by a DC voltage determined by C23, R14, and R15. Basically, CMOS switches IC3A and IC3C toggle to produce a highlighted ROI on the video display.

Figure 7:
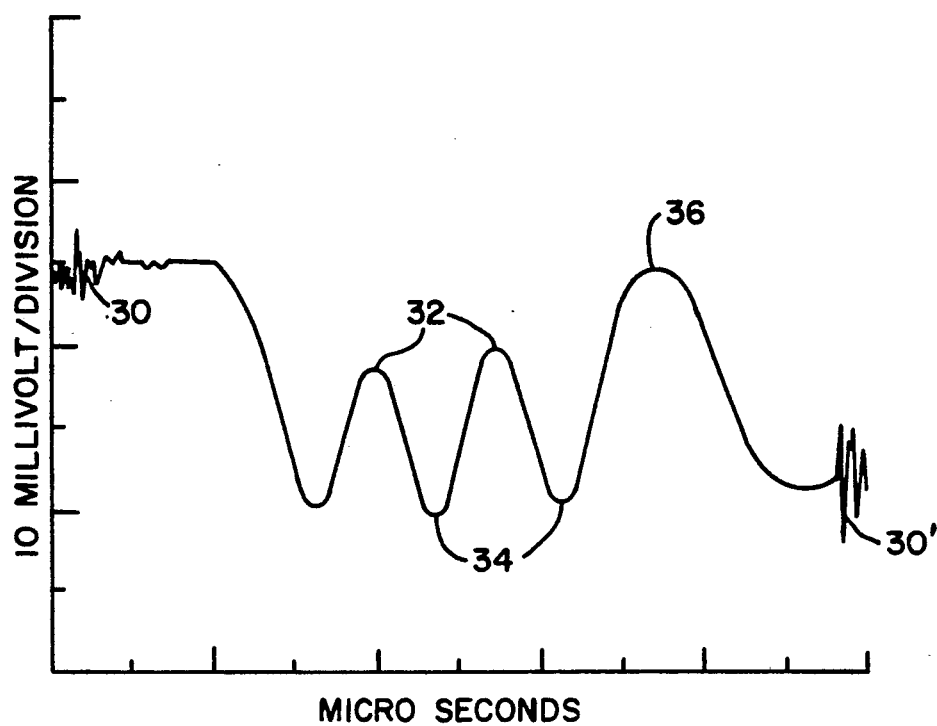
FIG. 7 is a graphic view of an actual oscilloscope trace of a three line (bar) grating target of a low light level NVG target.

Referring now to FIG. 7 wherein is illustrated an oscilloscope trace of a low light level target. The high frequency rings mark 30, 30, the beginning and the end of the high lighted region of the monitor screen. Approximately centered on the screen are two peaks 32, and three valleys 34 of a grating target, that is, two bright lines and three dark lines. The larger broad peak 36 rising above the x-axis is the bright region in between two gratings.

Figure 8:
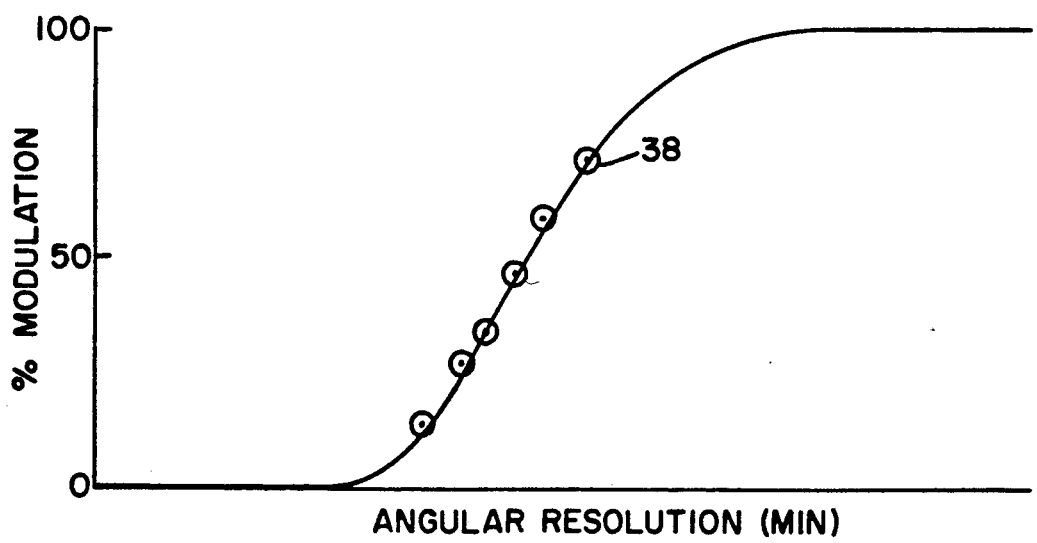
FIG. 8 is a graphic view of a cumulative log normal distribution function fit of six grating targets, increasing in fineness from right to left, of a typical night vision goggle at the lowest light level of a pattern display unit. The angular measure between adjacent black and white bars of a target grating.

FIG. 8 illustrates the modulation transfer function of a typical AN/AVS-6 Night Vision Goggles. The data illustrated in this Figure was obtained using a functional AN/AVS-6 Night Vision Goggle and a certified AN/3895 (TS) Test Set. The right-most data point 38 was obtained by measuring the average amplitude of the trace in FIG. 7 and normalizing it to a step change. The value of the step change is obtained by measuring the voltage difference of the video signal between an extended area of black and an area of white on the resolution test pattern.

The image analyzer system described hereinabove can be used in diverse applications requiring the measurement of absolute resolution or relative image quality. The overall ease of the measurement depends upon on the quality of the lens, camera, and oscilloscope used in the system. These generic components may be mixed, matched, or substituted with available equipment to provide a cost effective solution to a particular application or substituted later to extend/or upgrade the system's capabilities. The ease of use of this system derives from the custom electronic circuit which provides the proper trigger input to an oscilloscope whose trace corresponds to the highlighted region of the image viewed on the monitor.

The NVGRA implementation of the invention incorporates a computer to assist in the measurements and analysis the data. The computer controls the data acquisition of a digital oscilloscope. It initializes the oscilloscope to a preset condition and guides the user while the oscilloscope is instructed to automatically make the appropriate measurements and to transfer the information measured thereby to the computer. The computer provides interrupt-activated help screens and copies the trace of the video signal displayed on the oscilloscope onto the screen of the computer and displays duplicate instructions and information on the display screen of the oscilloscope. The computer analyzes and saves the data to a file and computes and plots the MTF. In addition, the inverse fourier transform is computed and a 3D image of the NVG point spread function is displayed. It furthers enables all or part of this information to be dumped to a printer and generates a test report thereon.

It is will be understood by one skilled in the art that various modifications can be made in the invention outlined hereinabove without departing from scope of the claims appended hereto.

I claim:

1. A system for quantitatively evaluating the resolution of imaging devices, comprising:
   a) test pattern means disposed in a controlled light environment and consisting of standard resolution targets of varying spatial fineness;
   b) means for positioning an imaging device in a position where said imaging device focuses on said test pattern;
   c) a charge coupled device (CCD) camera disposed in a position to view said test pattern through said imaging device or image produced by said imaging device and for generating a video signal in response to images produced from said test pattern;
   d) a custom image analysis circuit disposed to receive and modify said video signal and for providing a modified video signal and triggering pulses corresponding to a predetermined point in modified region of said video signal;
   e) an oscilloscope for receiving said video signal and said triggering pulses to quantitatively measure light level distribution in the modified region of the video signal;
   f) computer means to control data acquisition of said oscilloscope and for setting said oscilloscope to a pre-set condition, enabling it to measure signals received from said custom image analysis circuit and t transmit information derived from said signals to said computer; and
   g) computer program means to analyze data from individual targets to generate a regression line fitting the data to a cumulative log normal distribution function as an approximation of the said imaging device's modulation transfer function.

2. A system as set forth in claim 1, wherein said custom image analysis circuit comprises a video blanking circuit having a plurality of timers and electronic single pole switches to blank a specific portion of a single video raster line of a video image.

3. A system as set forth in claim 1, wherein said custom image analysis circuit comprises a sync stripper circuit, a coarse delay circuit, a fine delay circuit, a blanking pulse circuit, and a video blanking circuit.

4. A system for quantitatively evaluating video images, comprising:
   a) test pattern means;
   b) a charge coupled device (CCD) camera disposed in a position to view said test pattern and for generating a video signal in response to images of said test pattern;
   d) a custom image analysis circuit disposed to receive and analyze said video signal and for providing a blanked video signal and triggering pulses in relation thereto;
   e) an oscilloscope for receiving said video signal and said triggering pulses; and
   f) computer means to control data acquisition of said oscilloscope and for setting said oscilloscope to a pre-set condition, causing it to measure signals received from said custom image analysis circuit and to compare said signals to a standard and to transmit information derived from said signals to a computer display terminal.

* * * * *